US009544348B2

(12) United States Patent
Devereaux et al.

(10) Patent No.: US 9,544,348 B2
(45) Date of Patent: Jan. 10, 2017

(54) CLOUD-BASED RENDERING

(71) Applicant: Google Inc., Mountain View, CA (US)

(72) Inventors: Sean Patrick Devereaux, Newton, MA (US); Brian Gregory Cipriano, Cambridge, MA (US); Brian Frederick Drewes, Brookline, MA (US)

(73) Assignee: Google Inc., Mountain View, CA (US)

( * ) Notice: Subject to any disclaimer, the term of this patent is extended or adjusted under 35 U.S.C. 154(b) by 689 days.

(21) Appl. No.: 13/734,809

(22) Filed: Jan. 4, 2013

(65) Prior Publication Data

US 2014/0195589 A1 Jul. 10, 2014

(51) Int. Cl.
*H04L 29/06* (2006.01)
*H04L 29/08* (2006.01)

(52) U.S. Cl.
CPC ......... *H04L 65/605* (2013.01); *H04L 67/1097* (2013.01)

(58) Field of Classification Search
CPC .. G06F 3/1206; G06F 3/1285; G06F 11/3495; G06F 2201/815; H04L 51/063; H04L 67/02; H04L 67/1097; H04L 9/14; H04L 30/0283; G11B 27/34; G11B 27/031; H04N 5/272; H04N 21/4782; H04N 1/00188; G06Q 50/184; G06Q 30/0283
See application file for complete search history.

(56) References Cited

U.S. PATENT DOCUMENTS

| | | | | |
|---|---|---|---|---|
| 8,763,054 B1* | 6/2014 | Eilam | ................ | H04N 21/4316 725/100 |
| 8,775,545 B1* | 7/2014 | Eilam | ................... | G06F 9/4445 709/213 |
| 8,838,749 B1* | 9/2014 | Tidd | ....................... | G06F 9/5044 709/203 |
| 9,015,483 B2* | 4/2015 | Baskaran | ............ | H04L 63/0428 713/168 |
| 2002/0138764 A1* | 9/2002 | Jacobs | ..................... | G06F 21/10 726/28 |
| 2003/0026592 A1* | 2/2003 | Kawahara | ............ | G11B 27/031 386/281 |
| 2003/0115150 A1* | 6/2003 | Hamilton | ............... | G06Q 20/00 705/64 |
| 2007/0288551 A1* | 12/2007 | Sidon | ..................... | H04L 51/38 709/203 |

(Continued)

OTHER PUBLICATIONS

International Search Report and Written Opinion mailed Mar. 27, 2014 in international application No. PCT/US2013/074326, 9 pgs.

*Primary Examiner* — Sargon Nano
(74) *Attorney, Agent, or Firm* — Fish & Richardson P.C.

(57) ABSTRACT

This document describes methods, systems and computer program products related to cloud-based rendering. The subject matter of this document is embodied in a method that includes receiving, at a server from a remote client application, files related to rendering of a frame, and storing the files related to the rendering of the frame at storage locations local to the server. The files are stored in accordance with an organization of the files on a remote computing device associated with the remote client application. The method also includes rendering the frame from the files using a rendering application determined based on information associated with the files, and making the rendered frame available to the remote client application.

36 Claims, 9 Drawing Sheets

(56) References Cited

U.S. PATENT DOCUMENTS

| | | | |
|---|---|---|---|
| 2008/0174598 A1* | 7/2008 | Risenhoover | G06F 17/5004 345/419 |
| 2008/0215468 A1* | 9/2008 | Monsa-Chermon | G06Q 10/00 705/34 |
| 2009/0288019 A1* | 11/2009 | Tunning | G06F 17/3089 715/760 |
| 2010/0064277 A1* | 3/2010 | Baird | G06F 8/72 717/120 |
| 2011/0022642 A1* | 1/2011 | deMilo | G06F 17/30082 707/805 |
| 2011/0173637 A1* | 7/2011 | Brandwine | G06F 9/5072 719/314 |
| 2012/0271953 A1* | 10/2012 | Gulley | G06F 9/5027 709/226 |
| 2012/0278439 A1* | 11/2012 | Ahiska | A63F 13/12 709/218 |
| 2013/0031217 A1* | 1/2013 | Rajapakse | H04L 65/4076 709/219 |
| 2013/0086572 A1* | 4/2013 | Iriumi | G06F 8/60 717/168 |
| 2013/0179574 A1* | 7/2013 | Calder | G06F 9/5033 709/226 |
| 2013/0210522 A1* | 8/2013 | Dharmapurikar | G06T 15/005 463/31 |
| 2014/0067913 A1* | 3/2014 | von Haden | H04L 67/2852 709/203 |

* cited by examiner

CLOUD-BASED RENDERING

TECHNICAL FIELD

This disclosure relates to cloud-based rendering.

BACKGROUND

In some cases, rendering is a process of creating frames of computer generated images or videos from a set of instructions and commands. Rendering can be time consuming and computationally intensive, often requiring expensive and powerful hardware.

SUMMARY

In one aspect, a method includes receiving, at a server from a remote client application, files related to rendering of a frame, and storing the files related to the rendering of the frame at storage locations local to the server. The files are stored in accordance with an organization of the files on a remote computing device associated with the remote client application. The method also includes rendering the frame from the files using a rendering application determined based on information associated with the files, and making the rendered frame available to the remote client application.

In another aspect, a method includes integrating within a user-interface of an image-editing application, a control to facilitate communications between the image-editing application and a client application on a computing device. The method also includes receiving through the control, user-entered information associated with rendering of a frame, and providing the information to the client application for use in communicating with a remote computing device that renders the frame based on files provided by the client application.

In another aspect, a method includes receiving, at a client application executing on a computing device, information that is associated with rendering of a frame. The information is received from an image-editing application executing on the computing device. The method also includes determining, based on the information, locations of files associated with the rendering, providing the files to a remote server, and receiving from the remote server the frame as rendered from the files provided to the remote server.

In another aspect, a method includes receiving, at a server from a remote client application, files related to rendering of a frame. The method also includes rendering the frame from the files using a rendering application determined based on information associated with the files, and determining a cost associated with using the rendering application. The method further includes providing a notification of the cost to the remote client application.

In another aspect, a system includes a storage device and a computing device. The computing device includes memory and a processor and is configured to receive from a remote client application, files related to rendering of a frame. The computing device is also configured to store the files on the storage device, in accordance with an organization of the files on a remote computing device associated with the remote client application. The computing device renders the frame from the files using a rendering application determined based on information associated with the files, and make the rendered frame available to the remote client application.

In another aspect, a system includes a computing device having memory and a processor. The computing device is configured to integrate within a user-interface of an image-editing application, a control to facilitate communications between the image-editing application and a client application on a computing device. The computing device is also configured to receive through the control, user-entered information associated with rendering of a frame, and provide the information to the client application for use in communicating with a remote computing device. The remote computing device renders the frame based on files provided by the client application.

In another aspect, a system includes a computing device having memory and a processor. The computing device is configured to receive, at a client application, information that is associated with rendering of a frame. The information is received from an image-editing application also executing on the computing device. The computing device is configured to determine, based on the information, locations of files associated with the rendering, provide the files to a remote server, and receive from the remote server the frame as rendered from the files provided to the remote server.

In another aspect, a system includes a computing device having memory and a processor. The computing device is configured to receive from a remote client application, files related to rendering of a frame. The computing device renders the frame from the files using a rendering application determined based on information associated with the files. The computing device is also configured to determine a cost associated with using the rendering application, and provide a notification of the cost to the remote client application.

In another aspect, a computer program product includes a computer readable storage device that is encoded with instructions. The instructions, when executed by one or more processors, cause operations that include receiving, at a server from a remote client application, files related to rendering of a frame, and storing the files related to the rendering of the frame at storage locations local to the server. The files are stored in accordance with an organization of the files on a remote computing device associated with the remote client application. The operations also include rendering the frame from the files using a rendering application determined based on information associated with the files, and making the rendered frame available to the remote client application.

In another aspect, a computer program product includes a computer readable storage device that is encoded with instructions. The instructions, when executed by one or more processors, cause operations that include integrating within a user-interface of an image-editing application, a control to facilitate communications between the image-editing application and a client application on a computing device. The operations also include receiving through the control, user-entered information associated with rendering of a frame, and providing the information to the client application for use in communicating with a remote computing device that renders the frame based on files provided by the client application.

In another aspect, a computer program product includes a computer readable storage device that is encoded with instructions. The instructions, when executed by one or more processors, cause operations that include receiving, at a client application executing on a computing device, information that is associated with rendering of a frame. The information is received from an image-editing application executing on the computing device. The operations also include determining, based on the information, locations of files associated with the rendering, providing the files to a remote server, and receiving from the remote server the frame as rendered from the files provided to the remote server.

In another aspect, a computer program product includes a computer readable storage device that is encoded with instructions. The instructions, when executed by one or more processors, cause operations that include receiving, at a server from a remote client application, files related to rendering of a frame. The operations also include rendering the frame from the files using a rendering application determined based on information associated with the files, and determining a cost associated with using the rendering application. The operations further include providing a notification of the cost to the remote client application.

Implementations of the above can include one or more of the following features. A first script identifying a first storage location on the remote computing device can be detected within a file, and replaced with a second script identifying a second storage location local to the server. A determination can be made that a file required for rendering the frame is not one of the received files. The client application can be requested to provide the required file. The required file can be retrieved from a storage location determined based on a file-type of the required file. The storage location can be a networked storage location associated with the file-type. The rendering application can be determined based on an image-editing application associated with the remote computing device. A plug-in can be provided for the image-editing application, to integrate a control within a user-interface of the image-editing application. The control can be configured to facilitate communications between the image-editing application and the client application. The computations associated with rendering the frame can be allocated between two or more processors. The frame can be rendered based on the computation results from the two or more processors. Licensing and usage tracking of the rendering application can be managed from the server. The server can be configured to provide one or more files for installing the client application on the remote computing device. A copy of the rendered frame can be stored at a storage location local to the server.

The plug-in for installing the control within a user-interface of the image-editing application can be received at the computing device executing the image editing application from a server. The computing device executing the image-editing application can be configured to receive the frame from the client application, as rendered by the remote computing device. Information on the files can be provided to the client application. The user-entered information can include an indication that the frame is to be rendered. The client application can be launched after receiving the user-entered information, upon determining that the client application is not executing on the computing device.

The remote server can be polled by the computing device for a communication. An additional file can be provided to the remote server based on determining, from a communication from the remote server, that the remote server is requesting the additional file. A notification can be provided to the remote server that the additional file is not available on the computing device, based on determining, from a communication from the remote server, that the remote server is requesting the additional file. Information associated with the locations of the files on the computing device can be provided to the remote server. A communication from the remote server can indicate that the frame, as rendered, is available for download to the computing device. The communication from the remote server can provide information on a status of the rendering. Information associated with the image-editing application on the computing device can be provided to the remote server.

A communication can be initiated with a vendor of the rendering application. The cost can be determined in accordance with a pre-determined agreement with a vendor of the rendering application. The rendering application can be used in accordance with a pre-determined agreement with a vendor of the rendering application.

Advantages of the technology described in this document can include one or more of the following. Computationally intensive rendering jobs can be outsourced to a cloud-based rendering system. Rendering jobs can be initiated directly from an application that is used to create and edit images, video, text, and other kinds of content using a client application that manages communications with the cloud-based rendering system. Rendering results can be obtained quickly without having to install expensive and powerful computing resources.

Other features and advantages are apparent from the following detailed description, and from the claims.

DETAILED DESCRIPTION

In some cases, rendering is a process of generating a frame of image or video from a set of attributes (collectively often referred to as a scene file), using suitable computer programs. The attributes can include, for example, geometry, viewpoint, texture, lighting, and shading information, and other descriptors of a virtual scene to be depicted by the frame. The scene can include graphics, images, texts, and other content that is to be processed and assembled in the process of rendering. The data contained in the scene file is passed to a rendering application to be processed based on the attributes and output to a digital image or raster graphics image file. The process of rendering is used, for example, in the creation of visual effects for motion pictures, or in visualization and simulation tasks in building design and architecture. In general, the process of rendering is computationally intensive and requires specialized and expensive hardware. The cloud-based rendering described in this document allows for the rendering process to be outsourced to a cloud computing system, thus reducing the need for expensive hardware to be installed at a user's location. Multiple processors available to the cloud computing system can be used for the rendering process to significantly shorten turnaround time. A client application installed on the user's computing device can be used to facilitate communications with the cloud computing system. By managing various aspects such as data transfers, data security, storage, computing resources, and licensing, the cloud-based rendering described in this document empowers devices with limited computing resources to fulfill their rendering needs.

Figure 1:
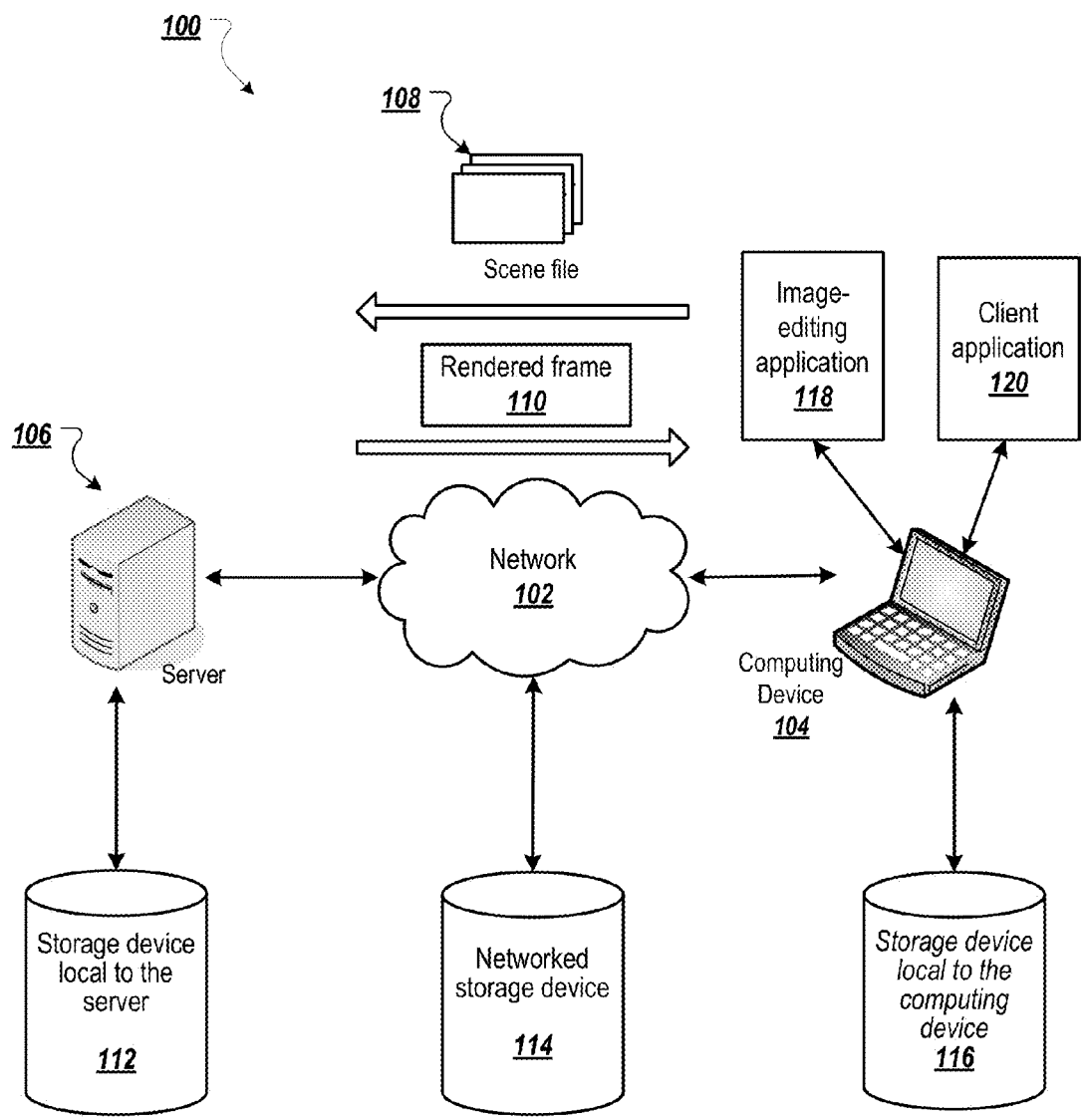
FIG. 1 is an example of a cloud-based rendering system.

FIG. 1 shows an example of a cloud-based rendering system 100. The system 100 includes a computing device 104 communicating with a server 106 over a network 102. As an overview, the computing device 104 sends one or more files related to rendering of a frame over the network 102 to the server 106. The files related to the rendering of the frame can be collectively referred to as a scene file 108. The scene file can include files of various file-types. For example, the scene file 108 can include one or more image or video files (e.g., files with one of the following filename extensions: .tif, .jpg, .png, .rgb, .psd, .mov, .dpx, .cin, or .r3d), one or more data files including information on attributes such as geometry, cameras, etc. (e.g., files with one of the following filename extensions: .abc, .obj, .fbx, or .rib), and one or more files related to an image editing application (e.g., files with one of the following filename extensions: .nk, .ma, .mb, .max, .ae, .c4d, or .hip). The server 106 is a part of a cloud computing system that executes the rendering process based on the scene file 108, and makes a rendered frame 110 available for the computing device 106. In some implementations, the rendered frame 110 is made available by being transmitted to the computing device 104. In some embodiments, the server 106 provides a notification to the computing device 104 that the rendered frame 110 is available for download. The server 106 can access a local storage device 112. The computing device 104 can access a corresponding local storage device 116. A local storage device for a given entity (such as a server or a computing device) can be defined as a storage device that is directly connected to the entity, or as a storage device that can be directly accessed by the entity. Entities that are connected over the network 102 can be considered to be remote to one another. Accordingly, the computing device 104 is remote with respect to the server 106 and vice-versa. The system 100 can also include a networked storage 114 that can be accessed over the network 102.

The computing device 104 (which can also be referred to as a client computing device, client device, or simply client) is a device on which a user executes an image-editing application 118 to define a computer generated image or video frame. The computing device 104 can be, for example, a laptop or desktop computer, a mobile device, or a tablet device, or another device capable of executing the image-editing application 118. The image-editing application 118 can include, for example, a computer graphics software package such as Maya®, or 3ds Max®, both developed by Autodesk Inc., a digital compositing software package such as Nuke™ developed by The Foundry Visionmongers Ltd., or another commercially available application that allows for creating or editing computer-generated images and graphics. The image-editing application 118 can be used to define various attributes related to an image or video. For example, the image-editing application can be used to define one or more frames of a length of an animation, an appearance of an image, a size of an image, or an object, text or other content within an image. The appearance of each of the frames to be rendered can be defined or modified using various attributes, such as, shading, texture, shadows, highlights, depth of field, blurs, transparency, reflections, or another attribute that affect how an image appears to a viewer. In some implementations, the image-editing application 118 is executed on the computing device 104. Alternatively, the image-editing application 118 can be provided from a remote server, for example as a web-based service. In some cases, the image-editing application 118 can be accessed through a browser executing on the computing device 104.

In some implementations, the image attributes defined using the image-editing application 118 can be represented using the scene file 108. The scene file 108 can be processed by a rendering application to produce a rendered frame 110, which can be displayed as a visual representation on a suitable display device. Portions of the scene file 108 can be initially stored in a storage device 116 local to the computing device 104. The storage device 116 can include, for example, a hard drive, memory, a removable storage device, or an optical disk that can be accessed by the computing device 104.

In some implementations, the computing device 104 provides the scene file 108 to a cloud computing system represented by the server 106. In general, a cloud computing system allows for the use of remote computing resources (hardware and software) that are delivered as a service over a network. In the present example, the server 106 can include (or communicate with) multiple processors that can work in parallel to expedite the rendering of the frame 110 from the scene file 108.

Figure 5A:
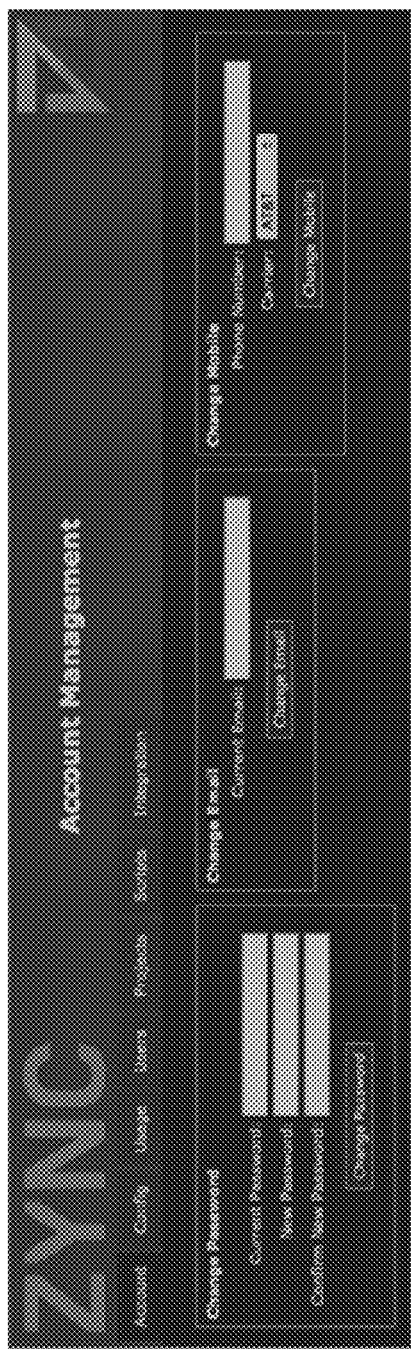
FIGS. 5A-5E show examples of user-interfaces.

In some implementations, communication between the computing device 104 and the server 106 can be facilitated by a client application 120 executing on the computing device 104. The client application 120 can be invoked, for example, by a control integrated into a user-interface of the image-editing application 118. The control can be integrated into the user-interface of the image-editing application 118 by a plug-in downloaded from a remote source such as a server, onto the computing device 104. In some implementations, at least one of the plug-in or the client application 120 can be invoked by accessing the cloud-computing system server through a browser executing on the computing device 104. In such cases, a user can be asked to set-up an account via a web-based interface to download the plug-in or the client application onto the computing device 104. An example of an account management interface 500 is depicted in FIG. 5A. The client application 120 can also be an application that executes separately from the image-editing application 118.

Figure 5B:
Figure 5C:
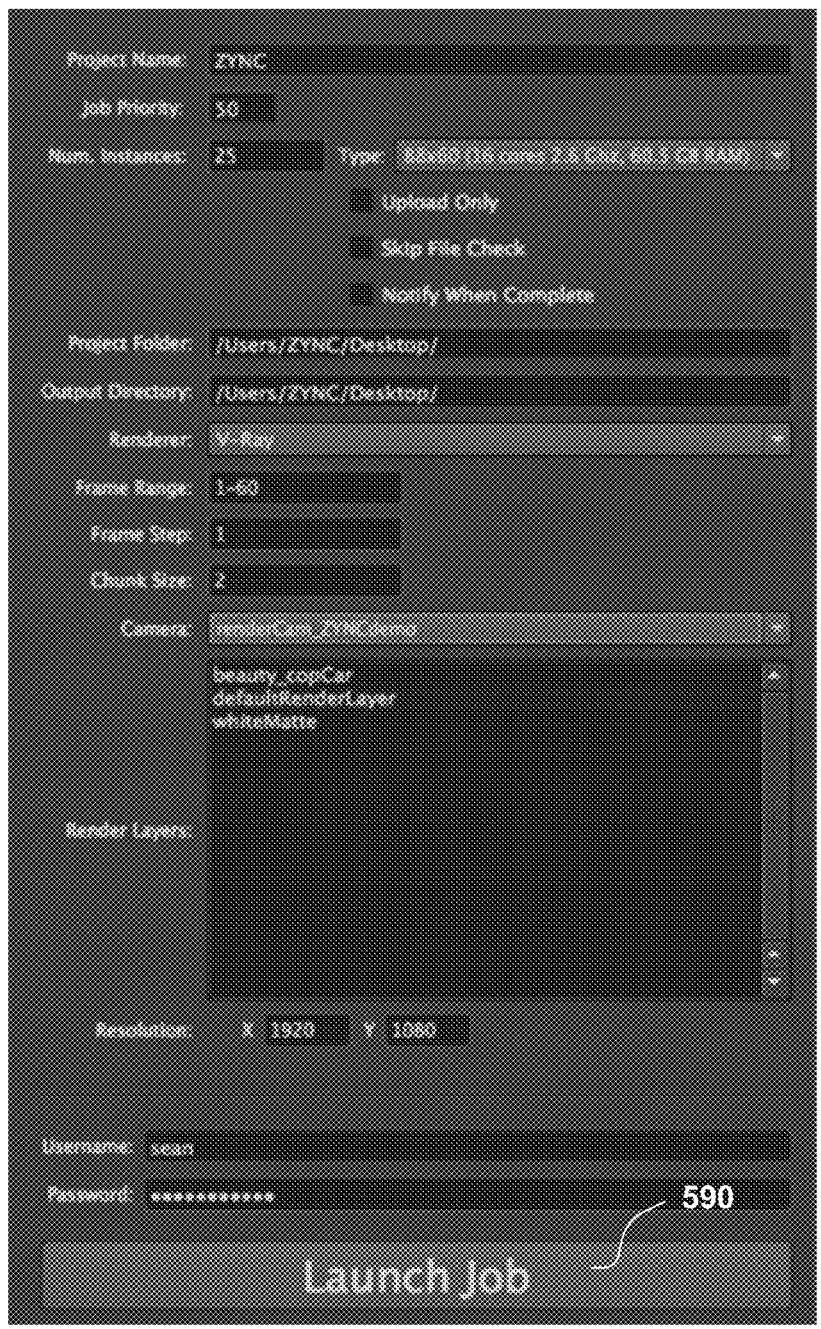
Figure 5D:
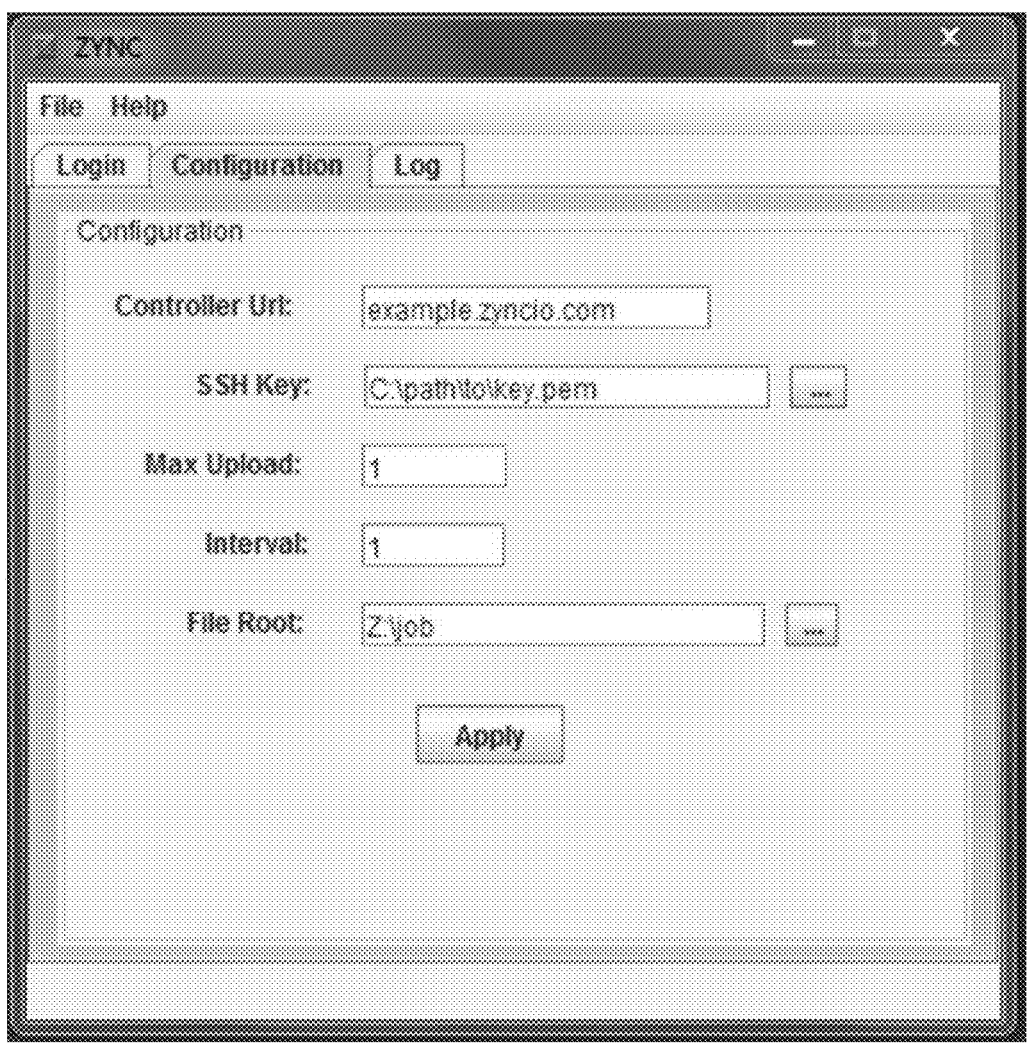

In some implementations, the client application 120 can be configured using a user-interface such as the user-interface 565 depicted in FIG. 5D. Various aspects and functionalities of the client application 120 can be configured using such the user interface 565. For example, the user-interface 565 can be used to provide the client application 120 with the location where a security key is stored. The security key can be provided from the cloud computing system (for example, by an administrator) upon setting up of an account. The security key can determine a level of authorization associated with the user of the account. The security key can also be used by the client application 120 to encrypt and/or decrypt data and files communicated between the computing device 104 and the server 106. In some implementations, the security key can be generated at the server 106 using a cryptographic network protocol such as secure shell (SSH). The user-interface 565 can also be used to specify other parameters associated with the client application 120, such as, the number of jobs that the client application 120 can simultaneously upload to the server 106, the frequency at which the client application 120 would poll the server 106, and the location of a folder the client application 120 is allowed to access.

In some implementations, the client application 120 manages the communications between the computing device 104 and the server 106. For example, once a user indicates a preference to launch a rendering job (e.g. using the control integrated in the image-editing application 118), the client application 120 facilitates exchanging files and messages between the computing device 104 and the server 106 in order to achieve the completion of the rendering by the server. In some implementations, the client application 120 sends a message to the server 106 that a rendering job needs to be performed. The server 106, in response, can send a request to the client application 120 for the scene file 108 required for the rendering job. The request can be sent, for example, upon determining that enough processors are available to the server 106 to perform the rendering within a threshold time period. If enough processors are not available, or the cloud computing system is unavailable for some other reason (e.g., maintenance), the server 106 can send a message to the client application 120 indicating the unavailability and/or a time the system is expected to be available again.

The client application 120 can manage uploading the scene file 108 from the computing device to the server 106. In some implementations, the client application 120 determines the locations of the one or more files associated with the scene file 108 on receiving information that a rendering job is to be uploaded to the server 106. The client application 120 can be configured to verify that the computing device 104 and/or a user of the computing device 104 is authorized/permitted to use the services provided by the cloud computing system through the server 106. Upon the verification, the client application 120 can provide one or more files associated with the scene file 108 to the server 106.

In some implementations, the client application 120 can receive, from the server 106, one or more messages related to the scene file 108 provided to the server 106. For example, the server 106 can request information on modification dates associated with one or more files from the scene file 108. In some implementations, this information is used by the server to determine if a copy of a file from the scene file 108 already exists in the storage device 112 local to the server, and if that copy represents the most updated version of the file. The server 106 can also request one or more additional files based on determining that the one or more additional files is needed for the rendering job requested by the client application 120. In response to the messages from the server 106, the client application can provide the requested information and/or files, if such information or files are available at the computing device 104.

Figure 5E:
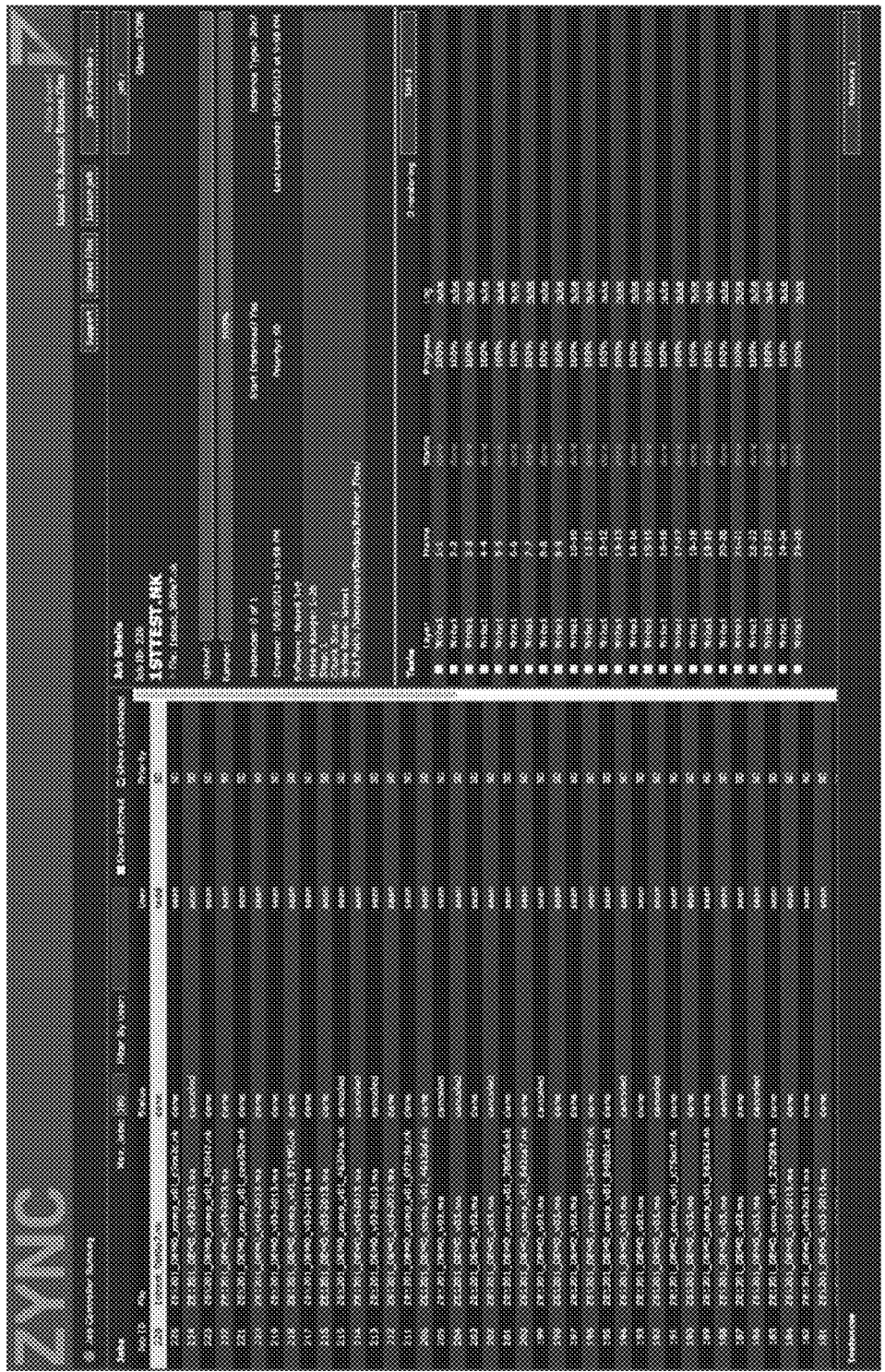

In some implementations, the client application 120 continues to poll the server 106 for a progress report of the rendering job after providing the files and information required for the rendering job. The polling can be done, for example, by periodically sending a message to the server 106 requesting a status update. In some implementations, the server 106 automatically provides, to the client application 120, a periodic status update. The client application 120 can be configured to facilitate display of the status update on the computing device 104, for example, via a user-interface. An example of such an user-interface 570 is depicted in FIG. 5E. In some implementations, the status update can include information that a rendered frame 110 is ready to be downloaded. Upon receiving such information, the client application 120 downloads the rendered frame 110 on to the computing device 104. The client application 120 can also be configured to communicate with the image-editing application 118 to determine if a rendering job is to be uploaded to the server 106.

The cloud computing system that performs the rendering job is represented by the server 106. The server 106 can include (or communicate with) multiple processors that can process a rendering job under a distributed computing framework. In some implementations, hundreds or thousands of processors can be used, thereby providing subscribers of the cloud computing system with scalable, on-demand computing capabilities. The server 106 can be configured to distribute a given rendering job (as represented by, for example, the scene file 108) to multiple processors and combine the results to produce the rendered frame 110. In some implementations, the server 106 can provide a plug-in to the computing device, wherein the plug-in integrates a control within the image-editing application 118 to communicate with the client application 120. The server 106 can also provide one or more files for installing the client application 120 on the computing device 104.

The server 106 can be configured to manage various aspects related to a rendering job requested by the client application 120. For example, upon receiving a scene file 108, the server 106 can process the scene file 108 to determine if additional files may be needed for the requested rendering job. Depending upon the file-types of the additional files (for example, upon determining that a file is related to a particular software package), the server 106 can either send a request to the client application 120 to provide the additional files, or retrieve the files from another location. In some implementations, if the server 106 determines that the additional files are available at a networked storage device 114, the server 106 may retrieve the additional files directly from the networked storage device 114. For example, if a required additional file is determined to be related to a particular software package, the server can be configured to contact a central repository associated with the software package to directly retrieve the required additional file.

In some implementations, the server 106 can be configured to determine if a version of an additional required file exists on the local storage device 112. Upon such determination, the server 106 may send a message to the client application requesting information if the file has been modified at the computing device 104 since the last upload. The server 106 may only request the file from the computing device if the file has been modified since the last upload, else, the server can use the version of the file available from the local storage device 112.

Upon receiving the files required for the rendering job, the server 106 can begin the rendering process. In some implementations, the server 106 selects an appropriate rendering application for the rendering job based on the files and information provided by the client application 120. The rendering application can be selected, for example, based on the image-editing application 118. The selected rendering application can be executed by the server, and possibly by the multiple processors participating in the rendering process, to produce the rendered frame 110 from the files and information received from the client application 120 or retrieved by the server 106.

In some implementations, the server 106 can be configured to manage licensing and usage-tracking with respect to the selected rendering application. For example, for a rendering application selected for a given rendering job, the server 106 may track an associated usage-parameter (for example, total usage time or job size), receive billing details from a vendor of the selected rendering application and provide an invoice for the usage. In some implementations, the server 106 can be configured to maintain logs that reflect the usage details. By managing licensing and usage-tracking, the server 106 prevents unauthorized use of the rendering application while relieving the end-user (i.e. the user of the computing device 104) from the burden. Further, multiple rendering applications can be made available for use with files from various sources and image-editing applications.

In some implementations, the files received from the client application 120 are stored on the local storage device 112 based on file-types identified for the received files. For example, if a given received file is related to a particular software package, the server 106 can be configured to store the given file within a folder reserved for storing files for the particular software package. In some implementations, if a received file is identified as a script file, the server 106 scans the script file for occurrences of file-paths identifying storage locations specific to the storage device 116 local to the computing device 104. The file-paths can then be automatically replaced by the server 106 with revised file-paths identifying storage locations specific to the local storage device 112. The files associated with the corresponding revised file-paths are then stored at storage locations specified by the revised file-paths. In this way, the server 106 organizes the files received from the computing device 104 on the local storage device 112 in a systematic fashion. In some implementations, the organization of the received files within the local storage device 112 includes mirroring the organization of the corresponding files on the storage device 116 local to the computing device 116.

During the rendering process, the server 106 can provide periodic updates on the process to the client application 120. For example, if the rendering job involves rendering multiple frames, the updates can include providing a preview (e.g. a thumbnail image) of each rendered frame as they are produced. In some implementations, once a rendered frame 110 is produced, the server 106 makes the rendered frame 110 available for the client application 120 to download on the computing device 104. The server 106 can also store a copy of the rendered frame 110 on the local storage device 112. This way, if a user needs to download the rendered frame 110 again (e.g. on a different computing device), the user can do so without having to execute the rendering process again. The server 106 can also retain the scene file 108 and one or more additional files related to the completed rendering job (possibly tied to a user account) such that at least some of the files need not be uploaded again for executing a similar rendering process.

Figure 2:
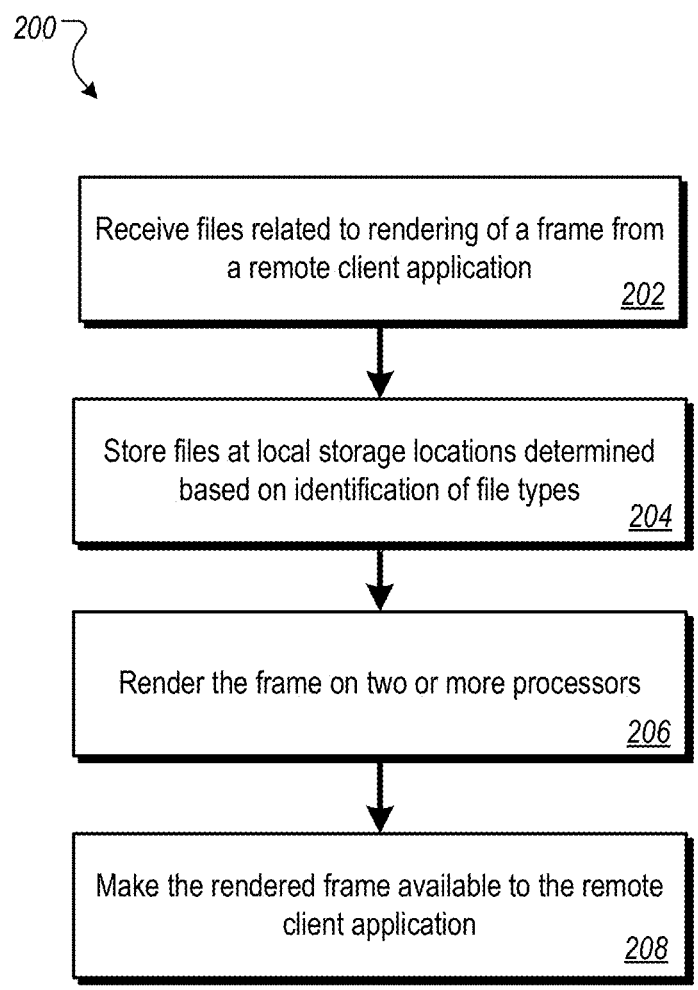
FIG. 2 is a flowchart depicting an example sequence of operations for rendering a frame.

FIG. 2 shows a flowchart 200 depicting an example sequence of operations for rendering a frame. The sequence of operations depicted by the flowchart 200 can be performed on a device such as the server 106 described with respect to FIG. 1. The operations include receiving files related to rendering of a frame from a remote client application (202). The remote client application can be executed on a computing device (e.g. the computing device 104 described with reference to FIG. 1). The received files can include a scene file having information on various attributes and objects that are to be used in the rendering of the frame.

Operations can include storing the received files at local storage locations determined based on identifying file-types for the received files (204). For example, if a received file is identified to be of a particular file-type, the particular received file can be stored at a particular location. The particular location can be determined, for example, in accordance with a storage location of the corresponding file at a remote storage location. If a received file is identified as a script file, the file can be scanned to identify occurrences of textual representation of file-paths related to one or more additional files. In such cases, the additional files can be stored in accordance with the textual representations of the file-paths. In some implementations, where the textual representations are specific to remote storage locations, the representations are replaced by revised textual representations of file-paths specific to local storage locations, and the additional files are stored in accordance with the revised textual representations.

Operations also include rendering the frame on two or more processors (206). For example, the process of rendering the frame can be distributed over multiple processors for parallel execution under a distributed computing framework. In some implementations, when multiple rendering jobs are to be executed, distributing the jobs can be done based on priority information associated with the jobs. For example, when only a limited amount of computing resources are available, a high priority job may be processed before a lower priority job, even if the lower priority job is received earlier. The computation results from the multiple processors can be combined to produce the rendered frame.

Operations also include making the rendered frame available to the remote client application (208). This can include, for example, storing the rendered frame at a storage location that the remote client application can access to download the rendered frame. In some implementations, when a rendered frame is made available, a message can be sent to the remote client with a notification that the rendered frame is available for download.

Figure 3:
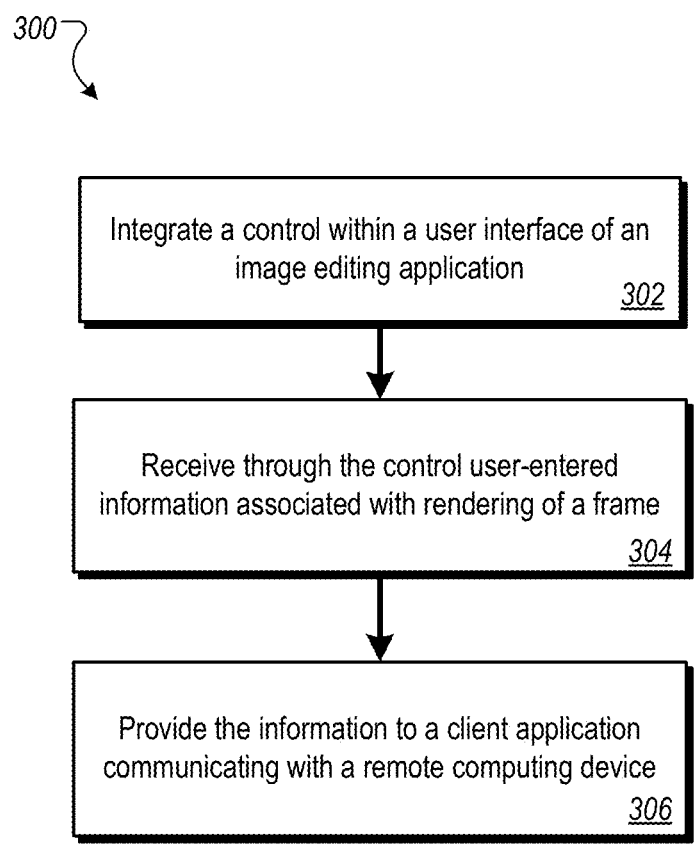
FIG. 3 is a flowchart depicting an example sequence of operations for interfacing between an image-editing application and a client application.

FIG. 3 shows a flowchart 300 depicting an example sequence of operations for interfacing between an image-editing application and a client application. The sequence of operations depicted by the flowchart 300 can be performed, for example, at the computing device 104 described with reference to FIG. 1. The image-editing application and the client applications can be substantially similar to the applications 118 and 120, respectively, described with reference to FIG. 1.

Operations can include integrating a control within a user-interface of an image-editing application (302). The control can be integrated, for example, using a plug-in for the image-editing application. The plug-in can be downloaded and installed for the control to be integrated within the user-interface of the image-editing application. The control can include, for example, a virtual button, a check-box, a tab, or another graphical representation. The control may be selectable using a mouse-click, or by touching a relevant portion of a touch-screen display. In some implementations, the control may not be visible on a user-interface but can be invoked as needed, for example, using an appropriate script-based command. An example of the control is depicted in the user-interface shown in FIG. 5B. In this particular example, the control 510 appears as a separate tab within the user-interface 505 and is similar to other controls within the user-interface 505. In some implementations, a control for activating the client application can also be integrated with a graphics pipeline management tool or production tracking software package such as Shotgun®, developed by Shotgun Software Inc.

Operations include receiving through the control user-entered information associated with the rendering of a frame (304). Referring again to the example of FIG. 5B, a user can select the control like any other control within the user-interface 500 to begin the rendering. In some implementations, selecting the control brings up another user-interface through which additional information related to the rendering can be entered by the user. An example of such a user-interface is shown in FIG. 5C. The user-interface 550 depicted in the example of FIG. 5C allows the user to provide details, such as, a location of the files related to the rendering, a name of the rendering project or job, a priority associated with a rendering job, a range of frames (e.g. a length of a shot being rendered), frame steps (e.g. whether every frame, or every second frame, or every third frame is to be rendered), layers to be included in a rendering job, location of an output directory, desired resolution, a user-name and password associated with an account, and other parameters and attributes associated with the rendering. After entering the information, the user can select a control (such as the control 590) to launch the rendering job.

Operations also include providing the information to a client application communicating with a remote computing device (306). The remote computing device renders the frame based on files provided by the client application. In some implementations, if the client information is not executing, operations can also include launching the client application such that the information can be provided to the client application.

Figure 4:
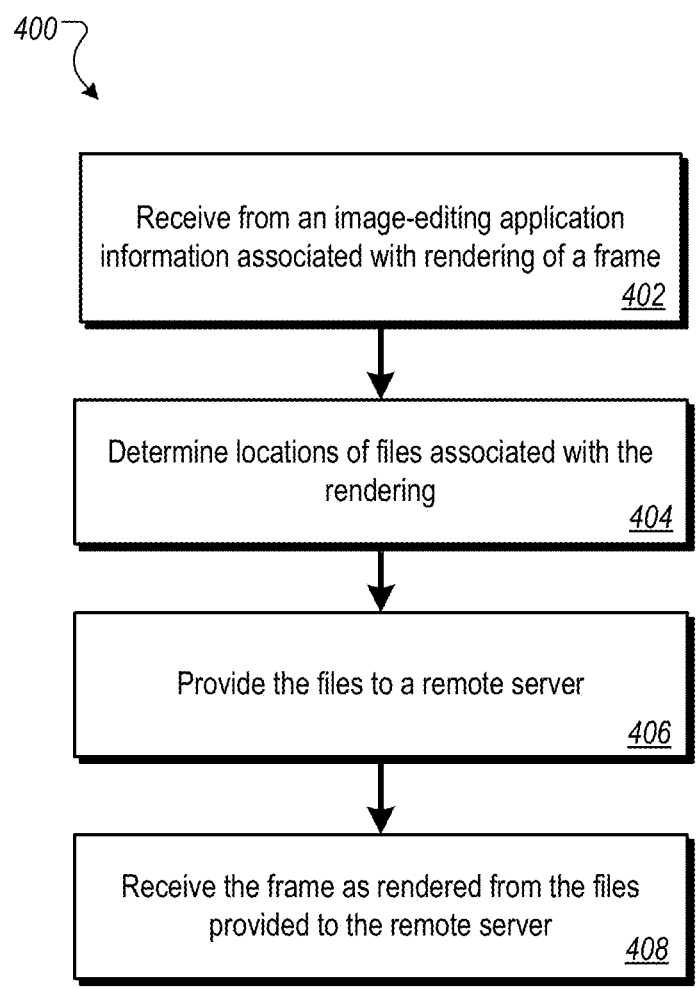
FIG. 4 is a flowchart depicting an example sequence of operations for communicating with a remote server to render a frame.

FIG. 4 shows a flowchart 400 depicting an example sequence of operations for communicating with a remote server to render a frame. The sequence of operations depicted in the flowchart 400 can be performed, for example, by the client application described with reference to FIG. 1. Operations include receiving from an image-editing application, information associated with rendering of a frame (402). The information from the image-editing application can be received, for example, when a user activates or selects a control integrated within a user-interface of the image-editing application. The information can include for example, an indication that a rendering job is to be launched, location of one or more files and/or folders related to the rendering job, an output directory where the rendered frame is to be saved, and one or more attributes related to the rendering job.

Operations also include determining locations of files associated with the rendering (404). The determination can be made, for example, based on information provided by the user. One or more of the files can then be retrieved from the determined location for forwarding to a remote server.

Operations also include providing the files to the remote server (406). In some implementations, copies of the files are uploaded to a location accessible by the remote server. Metadata information related to the files can also be provided. The metadata information of a file can include, for example, a file-type, location information, and file size. In some implementations, a file is provided to the remote server based on determining that the remote server is requesting the file.

Operations also include receiving the frame as rendered from the files provided to the remote server (408). In some implementations, when the rendering involves multiple frames, the frames can be received sequentially as and when they are produced. Alternatively, multiple frames can be received together. Receiving the frame can include receiving a notification that a rendered frame is available for downloading. A particular remote location can then be accessed to download the rendered frame.

Figure 6:
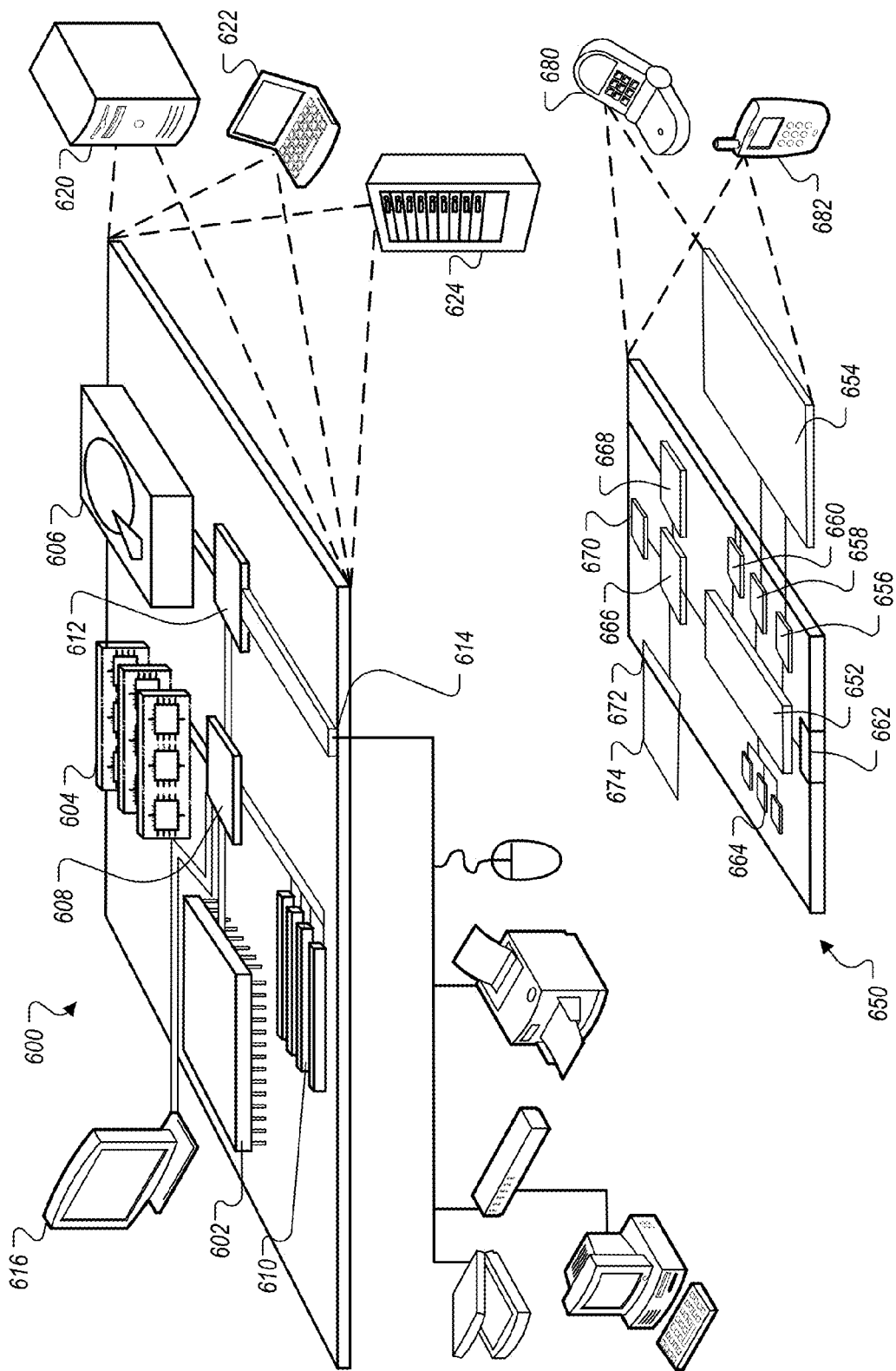
FIG. 6 is a diagram of a computing device.

FIG. 6 shows an example of a computing device 600 and a mobile device 650, which may be used with the techniques described here. Referring to FIG. 1, the computing device 104 could be examples of the computing device 600 or the mobile device 600, and the server 106 could include one or more computer devices 600. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system). In some implementations the computing device can include a graphics processing unit. The computing device 600 can also be configured to execute applications such as the image-editing application 118 and the client application 120 described with reference to FIG. 1.

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. Referring to FIG. 1, the storage devices 112, 114, or 116 could be examples of the storage device 606. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user-interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 574, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user-interface or a Web browser through which a user can interact with an implementation of the systems and techniques described here), or any combination of such back end, middleware, or front end components. The components of the system can be interconnected by any form or medium of digital data communication (e.g., a network such as the network 102 described with reference to FIG. 1). Examples of networks include a local area network ("LAN"), a wide area network ("WAN"), and the Internet.

The computing system can include clients and servers. A client and server are generally remote from each other and typically interact through a communication network such as the network 102. The relationship of client and server arises by virtue of computer programs running on the respective computers and having a client-server relationship to each other.

Other implementations are also within the scope of the following claims.

What is claimed is:

1. A method comprising:
   receiving at a server, from a control component of an image-editing application on a remote computing device, information indicative of rendering of a frame, wherein the control component is configured to interface between the image-editing application and the server, and the server is associated with a cloud-based rendering system that provides rendering for the image-editing application;
   receiving, at the server from the control component of the image-editing application, copies of files related to the rendering of the frame;
   storing the files related to the rendering of the frame at storage locations local to the server, in accordance with a second organization that mirrors a first organization of the of the files in one or more folders on the remote computing device;
   detecting, within at least one of the files, a first script identifying a file path associated with the first organization on the remote computing device;
   replacing the first script with a second script identifying a corresponding second file path associated with the second organization local to the server;
   rendering the frame using a rendering application determined based on information associated with the files by accessing at least a portion of the files stored in accordance with the second organization at the storage locations local to the server; and
   making the rendered frame available to the image-editing application.

2. The method of claim 1 comprising determining that a file required for rendering the frame is not one of the received files.

3. The method of claim 2 comprising requesting the image-editing application to provide the required file.

4. The method of claim 2 comprising retrieving the required file from a storage location determined based on a file-type of the required file.

5. The method of claim 4, wherein the storage location is a networked storage location associated with the file-type.

6. The method of claim 1 wherein the rendering application is determined based on the image-editing application.

7. The method of claim 1 comprising providing a plug-in for the image-editing application, to integrate the control component within a user-interface of the image-editing application.

8. The method of claim 1 comprising allocating between two or more processors, computations associated with rendering the frame.

9. The method of claim 8 comprising rendering the frame from computation results from the two or more processors.

10. The method of claim 1, comprising managing licensing and usage tracking of the rendering application.

11. The method of claim 1, comprising providing files for installing the image-editing application on the remote computing device.

12. The method of claim 1 comprising storing a copy of the frame at a storage location local to the server.

13. A system comprising:
   a storage device; and
   a computing device connected to the storage device, the computing device comprising memory and a processor, the computing device configured to:
      receive from a control component of an image-editing application on a remote computing device, information indicative of rendering of a frame, wherein the control component is configured to interface between the image-editing application and the computing device,
      receive from the control component of the image-editing application, copies of files related to the rendering of the frame,
      store the files on the storage device, in accordance with a second organization that mirrors a first organization of the of the files in one or more folders on the remote computing device,
      detect, within at least one of the files, a first script identifying a file path associated with the first organization on the remote computing device,
      replacing the first script with a second script identifying a corresponding second file path associated with the second organization local to the computing device,
      render the frame from the files using a rendering application determined based on information associated with the files, and
      make the rendered frame available to the remote client application.

14. The system of claim 13 wherein the computing device is configured to allocate between two or more processors, computations associated with rendering the frame.

15. The system of claim 14 wherein the computing device is configured to render the frame from computation results from the two or more processors.

16. The system of claim 13, wherein the computing device is configured to manage licensing and usage tracking of the rendering application.

17. The system of claim 13, wherein the computing device is configured to determine that a file required for rendering the frame is not one of the received files.

18. The system of claim 17, wherein the computing device is configured to transmit a request the control component to provide the required file.

19. The system of claim 17, wherein the computing device is configured to retrieve the required file from a storage location determined based on a file-type of the required file.

20. The system of claim 19, wherein the storage location is a networked storage location associated with the file-type.

21. The system of claim 13, wherein the rendering application is determined based on the image-editing application.

22. The system of claim 13, wherein the computing device is configured to provide a plug-in for the image-editing application, to integrate the control component within a user-interface of the image-editing application.

23. The system of claim 13, wherein the computing device is configured to provide files for installing the image-editing application on the remote computing device.

24. The system of claim 13, wherein the computing device is configured to store a copy of the frame at a storage location local to the computing device.

25. A computer program product comprising a computer readable storage device encoded with instructions, which upon execution by one or more processors, causes operations comprising:
    receiving at a server, from a control component of an image-editing application on a remote computing device, information indicative of rendering of a frame, wherein the control component is configured to interface between the image-editing application and the server, and the server is associated with a cloud-based rendering system that provides rendering for the image-editing application;
    receiving, at the server from the control component of the image-editing application, copies of files related to the rendering of the frame;
    storing the files related to the rendering of the frame at storage locations local to the server, in accordance with a second organization that mirrors a first organization of the of the files in one or more folders on the remote computing device;
    detecting, within at least one of the files, a first script identifying a file path associated with the first organization on the remote computing device;
    replacing the first script with a second script identifying a corresponding second file path associated with the second organization local to the server;
    rendering the frame using a rendering application determined based on information associated with the files by accessing at least a portion of the files stored in accordance with the second organization at the storage locations local to the server; and
    making the rendered frame available to the image-editing application.

26. The computer program product of claim 25 comprising instructions for allocating between two or more processors, computations associated with rendering the frame.

27. The computer program product of claim 26 comprising instructions for rendering the frame from computation results from the two or more processors.

28. The computer program product of claim 25 comprising instructions for determining that a file required for rendering the frame is not one of the received files.

29. The computer program product of claim 28 comprising instructions for requesting the client application to provide the required file.

30. The computer program product of claim 28 comprising instructions for retrieving the required file from a storage location determined based on a file-type of the required file.

31. The computer program product of claim 25, wherein the storage location is a networked storage location associated with the file-type.

32. The computer program product of claim 25, wherein the rendering application is determined based on the image-editing application.

33. The computer program product of claim 25 comprising instructions for providing a plug-in for the image-editing application, to integrate the control component within a user-interface of the image-editing application.

34. The computer program product of claim 25 comprising instructions for managing licensing and usage tracking of the rendering application.

35. The computer program product of claim 25 comprising instructions for providing files for installing the image-editing application on the remote computing device.

36. The computer program product of claim 25 comprising instructions for storing a copy of the frame at a storage location local to the server.

\* \* \* \* \*